July 17, 1962 S. M. ELLIS 3,044,601
CONVEYOR FOR DISH WASHERS
Filed Dec. 4, 1958 4 Sheets-Sheet 2
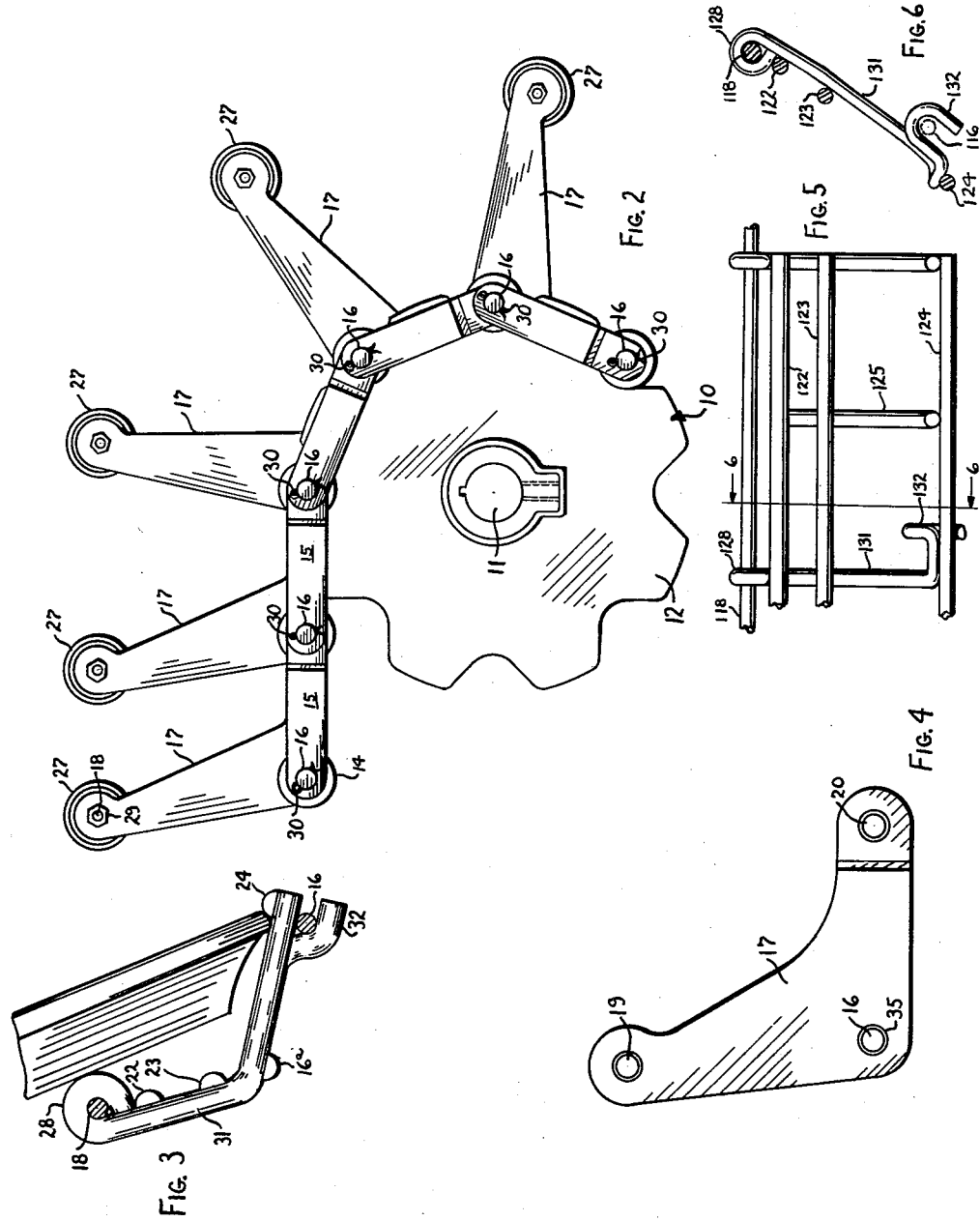
INVENTOR.
SYDNEY M. ELLIS
BY
Charles L. Lovenheck
ATTORNEY

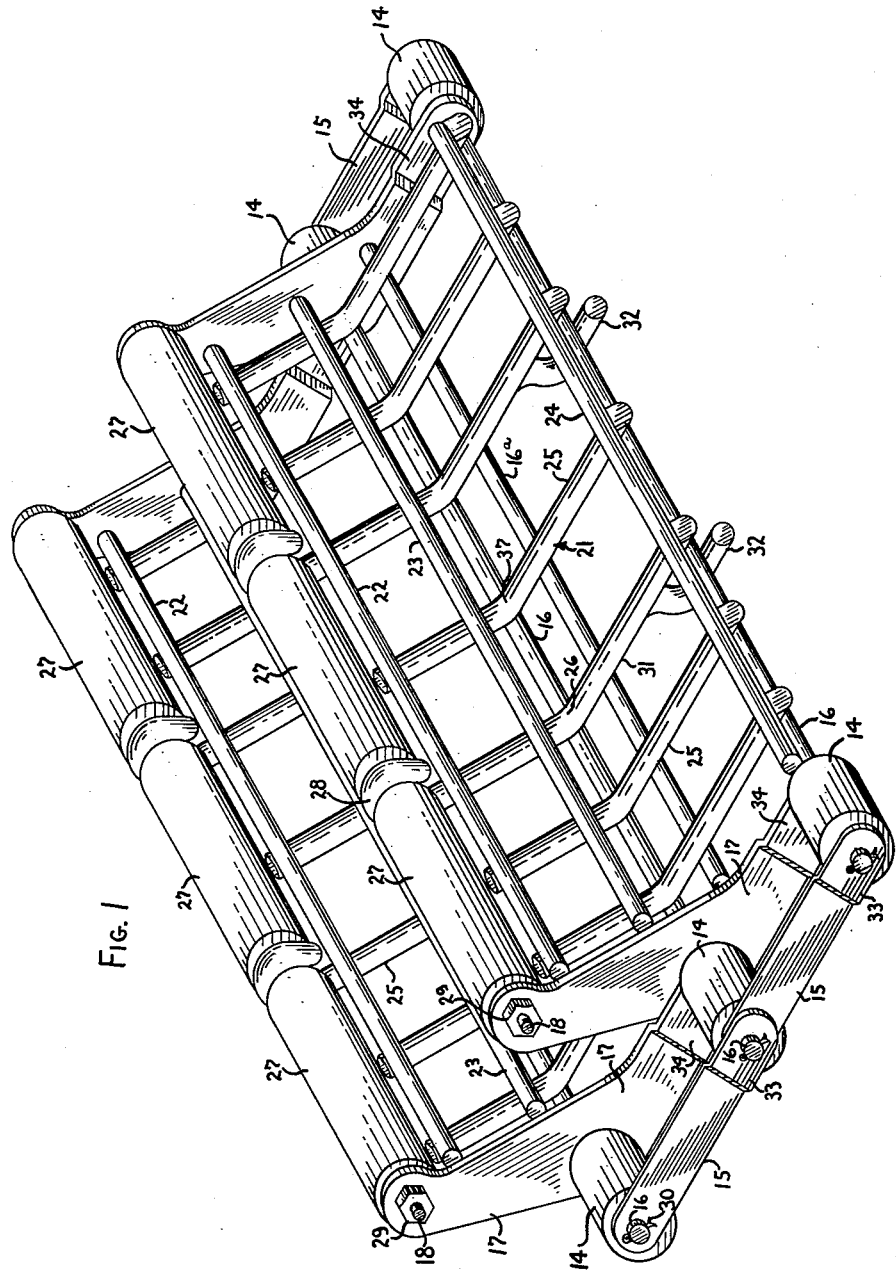

INVENTOR.
SYDNEY M. ELLIS
BY
ATTORNEY

July 17, 1962    S. M. ELLIS    3,044,601
CONVEYOR FOR DISH WASHERS
Filed Dec. 4, 1958    4 Sheets-Sheet 4

INVENTOR.
SYDNEY M. ELLIS
BY
ATTORNEY

United States Patent Office 3,044,601
Patented July 17, 1962

3,044,601
CONVEYOR FOR DISH WASHERS
Sydney M. Ellis, Erie, Pa., assignor to Champion Dish Washing Machine Company, Erie, Pa., a corporation of Pennsylvania
Filed Dec. 4, 1958, Ser. No. 778,158
9 Claims. (Cl. 198—131)

This invention relates to dish washers and, more particularly, to dish washers of the continuous open conveyor type.

According to present inventions, a dish washer is provided with a conveyor which may be used with or without racks for containing the dishes; that is, the dishes may be positioned on the conveyor directly or they may be put in racks and the racks carried on a belt. The dishes may be so positioned on the belt that during travel through the machine, they are upright and somewhat rearwardly inclined to assure that all washing fluid is drained off of the dishes during their travel through the machine.

The conveyor is open throughout its entire length so that when the dishes are placed in any desired position directly upon the conveyor or in the racks or otherwise, the wash sprays will have complete and full access to the dishes, regardless of the particular position of the dishes thereupon. The dishes are so positioned thereon that the sprays from a washing machine will have a highly effective washing action from above and below the conveyor. The conveyor is so designed that it may be loaded rapidly and easily.

The conveyor is provided with a wire dish support which may be made of stainless steel and coated with resilient material to protect the dishes or it may be used uncoated. The dish support is so made that it has a minimum number of supporting bars so that it may be assembled to the belt readily and rapidly without the need for threading a large number of supporting members from the belt into the supporting member, therefore making for economy of manufacture and simplicity of structure.

In dish washers of the type described herein, the dish washers are often operating with no dishes thereon. Consequently, a great deal of hot water is wasted when there are no dishes on the belt to be washed. Therefore, to conserve hot water, one embodiment of the present invention contemplates the use of a switch actuated by dishes in the belt which will be closed by dishes in the belt but will open when no dishes are on the belt to be washed. The switch presents a time delay which, because of its construction, causes the hot water to spray on the dishes over a prolonged time as the dishes move through the dish washer.

It is, accordingly, an object of the invention to provide a conveyor of open construction which is adapted for continuous operation for carrying dishes continuously through a dish washing machine and which contains laterally disposed spacers for resiliently supporting the dishes during the washing and rinsing operations of the machine.

Another object of the invention is to provide a dish washing machine having a continuous conveyor on which dishes may be supported between separating members arranged longitudinally of the machine and wherein the separating members have supporting members supported on lateral bars in the machine and the supporting members are supported by a minimum number of attaching devices thereon.

A further object of the invention is to provide an improved conveyor for a dish washing machine.

Still a further object of the invention is to provide an improved control means for a dish washing machine.

It is a further object of the invention to provide a dish washing machine which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is an enlarged isometric view of a section of a belt according to the invention;

FIG. 2 is a side view of the belt shown mounted in a machine showing a part of the machine;

FIG. 3 is an enlarged side view of a part of the belt;

FIG. 4 is an enlarged view of a link of the belt according to the invention;

FIG. 5 is a partial front view of another embodiment of the invention;

FIG. 6 is a cross sectional view taken on line 6—6 of FIG. 5;

Figure 7:
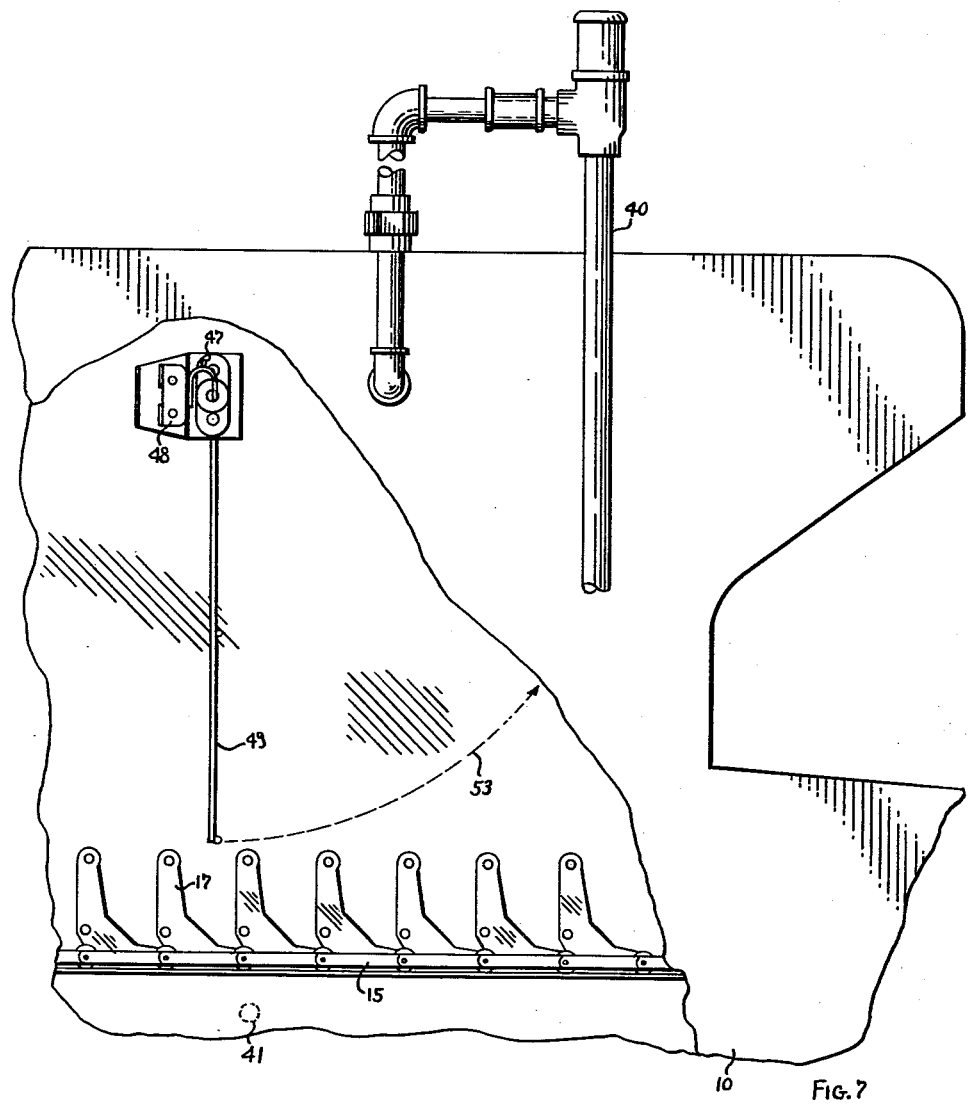
FIG. 7 is an enlarged side view of the dish washer shown in FIGS. 1 to 4 with a part of the casing broken away.

Now with more particular reference to the drawings, a machine 10 is shown for washing dishes or the like which has washing nozzles above and below the belt for dispensing washing fluid such as hot water onto the dishes. The machine 10 has transverse shafts 11 with sprockets 12 keyed thereto. At least one of the sprockets 12 will be driven by suitable power means in the conventional manner to rotate the belt. The belt is shown in section; however, it is understood that the belt will be continuous and driven around the sprockets 12.

The side chain members of the belt are made up of links 15 and triangular links 17 which are held in spaced relation to each other by means of rollers 14 and are held together by the ends of rods 16. The rods 16 pass through holes 20 and 35 in the links 17 and through holes at each end of the links 15. The spaced links 15 and 17 form laterally spaced chains carried on the sprockets 12 and supported on opposite ends of the shafts 11. The rods 16 extend completely across the belt and support the front ends of dish supports 21. A rod 16a is welded to the lower sides of fingers 25 and 31 and extends parallel to rods 23 and 24.

In this description, the belt is described with regard to the portion at the part thereof which is disposed above the sprockets 12 at a given time.

The tops of the triangular links 17 are held together by upper rods 18 which have nuts 29 on the ends thereof. The rods 18 pass through spacers 27 which may be made of rubber, resilient plastic, or other resilient material which will not damage the dishes engaging them. The rods 18 also pass through eyes 28 on the upper ends of the long fingers 31. The long fingers 31 are welded to the rods 22, 23, and 24. The intermediate fingers 25 are likewise welded to the rods 22, 23, and 24 but they terminate short of the upper rods 18. The rods 22, 23, and 24 are spaced and parallel to each other.

Brackets 32 are welded to the lower ends of the long fingers 31 and extend downwardly and forwardly therefrom with a portion parallel to the distal end portion of each of the long fingers 31 and the parallel ends are spaced from each other. The brackets 32 form with the ends of the long fingers 31 a U-shaped rod receiving member to receive the cross rods 16. Therefore, the dish supporting member 21 made up of the long fingers 31, short fingers 25, and the rods 22, 23, and 24 is supported on the chains by means of the rods 16 and 18. The long fingers 31 are bent at 26 and the short fingers 25 are bent at 37 as shown. The long fingers 31 and the short fingers 25 are parallel to each other. The ends of the cross rods 16 are secured by means of cotter pins 30. The links 15 and the triangular links 17 are offset at 33 and 34, respectively.

When dishes, for example, dinner plates, are supported in the belt without trays, the front edge of the dish will rest against the rod 24 which lies on top of the fingers 31 and 25 and the intermediate part of the dish may extend down between the fingers 31 and 25. The upper portion of the dish will lean back against the eyes 28 and against the spacers 27.

The embodiment of the invention shown in FIGS. 5 and 6 shows another form of the short fingers and long fingers as functioning members of the continuous conveyor belt shown in the first embodiment. Short fingers 125 are welded intermediate to cross rods 122, 123, and 124 with long fingers 131 occupying the distal ends of the rods 122, 123, and 124 and welded intermediate in a similar manner to the cross rods 122, 123, and 124. The upper portions of the short fingers 125 are welded to the lower cross bars 122 and 123 and continue in a downward angle to the lower portions of the short fingers 125 thereat to bend up and over the front cross bar 124 and welded thereon.

The long fingers 131 have eyes 128 formed on the upper ends through which upper cross rods 118 pass. The long fingers 131 continue in a downward and forward direction to the upper and lower cross bars 122 and 123 which are welded thereon. The fingers 131 extend downwardly to the front cross bar 124. At the front cross bar 124, the long fingers 131 bend up and over the front cross bar 124. At this point, the long fingers 131 are bent to a ninety degree angle and continue on top and parallel to the front cross bar 124 and are welded thereon. The long fingers 131 then bend back and upwardly at ninety degree angles. A one hundred eighty degree angle bend is then formed, developing the lower distal end bracket 132 which receives cross rods 116.

Figure 8:
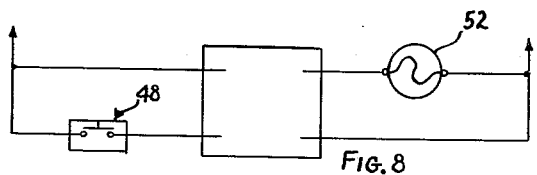
FIG. 8 is a view of the electrical circuit according to the invention.
Figure 10:
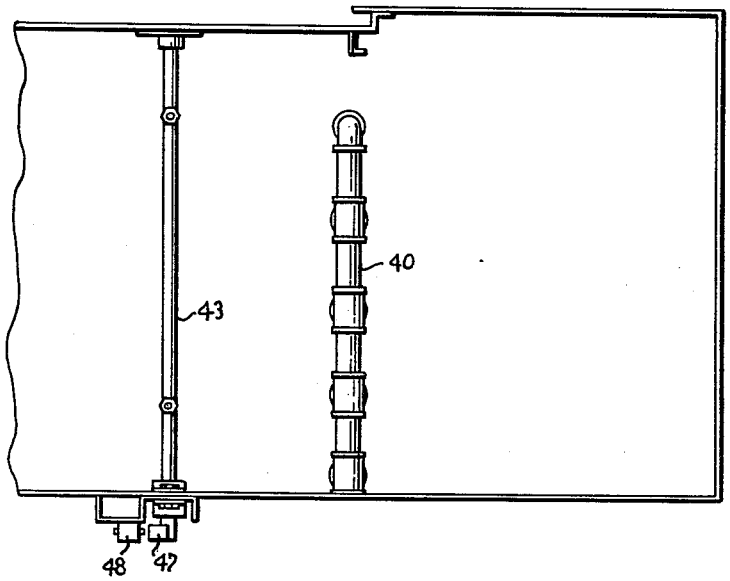
FIG. 10 is a top view with the cover of the dish washer removed.
Figure 9:
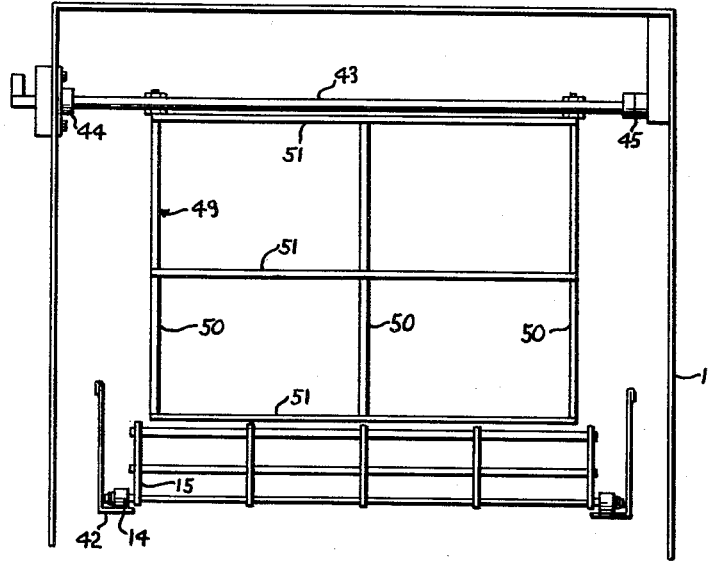
FIG. 9 is a front view of the dish washer.

FIGS. 7, 8, 9, and 10 show a dish washer with structure for turning on and off the hot water in a dish washer. The machine 10 has a belt made up of the links 15 and 17 supported on the sprockets 12 as shown in FIG. 2. A water supply pipe 40 connected to a suitable source of hot water is provided connected to the inside of the machine 10 and to a water spray and lower rinse 41. The rollers 14 are carried on a track 42 which is affixed to the dish washer frame. A transverse support shaft 43 is supported in bearings 44 and 45 at each side of the machine 10 and a mechanism or lattice 49 is attached to the end of the rod. The lattice 49 is connected to a switch lever 47. A microswitch 48 is attached to the side of the dish washer and is engaged and actuated by the switch lever 47. The switch lever 47 is attached to the shaft 43 and actuated thereby.

The lattice 49 is made up of three laterally spaced rods 50 connected to the shaft 43 at their upper ends and having spacer rods 51 welded thereto. The lattice 49 extends downwardly and terminates a short distance above the conveyor. The lattice 49, being attached to the support shaft 43, rotates the shaft 43 when it swings and, therefore, rotates the switch lever 47 to actuate the microswitch 48. The microswitch 48 is electrically connected in series with the circuit shown in FIG. 8 and a solenoid valve 52 is connected in the water supply line 40 which is in turn connected to the rinse and wash water connections 41.

When no dishes are supported on the conveyor, the lattice 49 will depend downwardly in the position shown. When a dish is put on the conveyor and as the dish is carried through the dish washer, it will engage the lattice 49 near the entrance of the dish washer and will swing the lattice 49 about the bearings 44 and 45 through a path 53 and the lever 47 will close the switch 48, completing the circuit through the solenoid valve 52, thereby turning the spray rinse on. As soon as all of the dishes have passed through the dish washer, the lattice 49 will swing back to its depending position shown in full in FIG. 7 and the water will again be turned off until more dishes go through the dish washer.

Therefore, by use of the lattice and the control shown, a great deal of warm water can be saved during the time that the dish washer does not have dishes therein and it will be turned on again as soon as dishes again come through the washer.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A conveyor for a dish washing machine, said conveyor comprising a pair of spaced chains carried on spaced sprockets on said dish washing machine, said chains each comprising plain links for running on the outside of said sprockets and triangular links for running on the inside of each said sprocket, said plain links being disposed in rows parallel to said triangular links, the forward end of each said plain link and each said triangular link being offset outwardly and overlying the rear end of the link adjacent thereto, the rear part of each said link being disposed in a common plane with the link ahead and behind it, rollers disposed between said plain links and said triangular links, lower cross rods, each said lower cross rod extending through the front end of one of said plain link and one said triangular link and the rear end of another plain link and one triangular link and through one said roller at each side of said conveyor, an upper cross rod, each said upper cross rod extending through the upper end of a said triangular link at each side of said conveyor, means at each end of each said upper cross rod restraining it against withdrawal from said links, said rollers being made of resilient material and supported on each said upper cross rod, dish supports, each said dish support comprising spaced short fingers and spaced long fingers disposed in parallel relation to each other, each said finger being bent at an intermediate position and extending upwardly and rearwardly from said intermediate position and downwardly and forwardly from said bent position, and an upper cross bar, a lower cross bar, and a front cross bar on each said dish support attached to the upper end, intermediate portion, and lower end, respectively, of said long fingers, said cross bars being disposed parallel to each other and each attached to said long fingers, each said long finger having an eye on the upper end thereof receiving one said cross rod and each said long finger having a bracket attached to the lower side of the lower end thereof and extending downwardly and forwardly therefrom and receiving one said lower cross rod between said bracket and the lower end of said long finger.

2. A conveyor for a dish washer comprising spaced chain members adapted to be received on spaced sprockets, longitudinally spaced upper cross rods and lower cross rods disposed parallel to each other and on said chain members, dish supports, each said dish support comprising laterally spaced fingers for supporting dinner plates and the like each in engagement therewith, each said finger of each said dish support being bent at an intermediate part thereof and extending upwardly and rearwardly and extending downwardly and forwardly from said bent part, an upper cross bar fixed to an upper part of each said finger, a lower cross bar fixed to an intermediate part of each said finger, and a front cross bar fixed to a lower part of each said finger, said cross bars extending laterally and parallel to each other, means on the upper ends of some of said fingers connecting said dish supports to said upper rods, and means supporting said dish supports on said lower cross rods.

3. The conveyor recited in claim 2 wherein some of said spaced chain members have upwardly extending portions thereon and said upper cross rods are received in openings in said upwardly extending portions.

4. The conveyor recited in claim 3 wherein said upper cross rods have spaced members attached to the upper ends of some of said chain members and said upper cross rods define laterally disposed, longitudinally spaced dish receiving openings therebetween, said front cross bars being attached to the top surfaces of said fingers and defining a support for the lower parts of dishes, and said upper cross rods defining a support for trays.

5. A conveyor for a dish washer comprising spaced chain members adapted to be received on spaced sprockets, longitudinally spaced upper cross rods and lower cross rods disposed parallel to each other and on said chain members, dish supports, each said dish support comprising laterally spaced fingers, each said finger of each said dish support being bent at an intermediate part thereof and extending upwardly and rearwardly and extending downwardly and forwardly from said bent part, an upper cross rod fixed to an upper part of each said finger, a front cross rod fixed to a lower part of each said chain member, said cross rods extending laterally and parallel to each other, means on the upper ends of some of said fingers connecting said dish supports to said upper rods, and means supporting said dish supports on said lower cross rods.

6. A conveyor for dishes comprising a chain, longitudinally spaced dish supports, said dish supports each comprising an upper cross bar and a lower cross bar spaced below and forward of said upper cross bar, laterally spaced fingers, and means attaching some of said fingers to said chain, said cross bars being attached to the upper surfaces of said fingers, some of said fingers engaging said lower cross bar at their lower ends, then extending upwardly over said lower cross bar, then extending laterally along said lower cross bar, then said fingers bending back on themselves toward said upper cross bar, and then said fingers being bent rearwardly back on themselves to form a hook comprising means to attach said dish supports to said lower cross bar.

7. The conveyor recited in claim 6 wherein eyes are formed at the upper ends of some of said fingers and said eyes receive said upper cross bar.

8. A conveyor for a dish washer comprising two laterally spaced chains, each said chain comprising triangular links having the lower front end of each said link on each said chain connecting to the lower rear end of the link adjacent it on the same chain, said means connecting said links comprising first rods connecting the tops of said links and third rods connecting the bottoms of said links, each said rod extending transversely of said conveyor and connecting the links on one said chain to the links of the other said chain, dish supports, said first rods connecting the tops of said links on one side of said conveyor to the tops of said links on the other side of said conveyor, said dish supports comprising fingers, some of said fingers on each said dish support being in the form of second rods having upper and lower ends with eyes in their said upper ends receiving said first rods and supported on said first rods, the said lower ends of said second rods being supported on said third rods connecting the bottoms of the same said links.

9. The conveyor recited in claim 8 wherein a plain link is disposed parallel to each said triangular link and spaced therefrom, a spacer is disposed between each said triangular link and each said plain link, one said rod connects the ends of each said plain link to each other, each said rod extends through each said spacer, and said plain links and said triangular links are adapted to receive the teeth of sprockets therebetween with said teeth engaging said spacers.

References Cited in the file of this patent
UNITED STATES PATENTS

| | | |
|---|---|---|
| 2,667,262 | Davis | Jan. 26, 1954 |
| 2,864,387 | Federighi | Dec. 16, 1958 |